(12) United States Patent
Walter

(10) Patent No.: US 7,549,435 B2
(45) Date of Patent: Jun. 23, 2009

(54) SYSTEMS AND METHODS FOR DETECTING AND CORRECTING A LEAK

(75) Inventor: Scott A. Walter, Trabuco Canyon, CA (US)

(73) Assignee: Onsite Pro, Inc., Trabuco Canyon, CA (US)

( * ) Notice: Subject to any disclaimer, the term of this patent is extended or adjusted under 35 U.S.C. 154(b) by 350 days.

(21) Appl. No.: 11/351,228

(22) Filed: Feb. 9, 2006

(65) Prior Publication Data

US 2007/0181186 A1    Aug. 9, 2007

(51) Int. Cl.
*F16K 23/00* (2006.01)

(52) U.S. Cl. .................... 137/15.11; 137/312; 137/558; 340/605

(58) Field of Classification Search ................. 137/312, 137/558, 15.11; 340/605, 514, 540
See application file for complete search history.

(56) References Cited

U.S. PATENT DOCUMENTS

| | | | |
|---|---|---|---|
| 4,380,243 A * | 4/1983 | Braley | 137/312 |
| 5,240,022 A * | 8/1993 | Franklin | 137/312 |
| 6,119,720 A | 9/2000 | Isaacson, Jr. et al. | |
| 6,186,162 B1 | 2/2001 | Purvis et al. | |
| 6,369,714 B2 | 4/2002 | Walter | |
| 7,044,154 B2 * | 5/2006 | Henderson et al. | 137/312 |

* cited by examiner

*Primary Examiner*—Kevin L Lee
(74) *Attorney, Agent, or Firm*—Knobbe, Martens, Olson & Bear, LLP

(57) ABSTRACT

A fluid leak detection system includes a sensor, a control module and a valve module. The sensor is adapted to be placed near a fluid source, such as a water supply line of an appliance. The valve module advantageously includes a motorized ball valve or a magnetic latch configured to arrest fluid flow through a supply line. The control module actuates the valve module and an audible alarm when the sensor detects a fluid leak. The valve module closes a valve positioned along the water line to restrict flow through the water line until the control unit has been manually reset or until the leaked fluid has been removed. The control module also features user inputs to allow the valve to be manually cycled for cleaning, for instance.

20 Claims, 14 Drawing Sheets

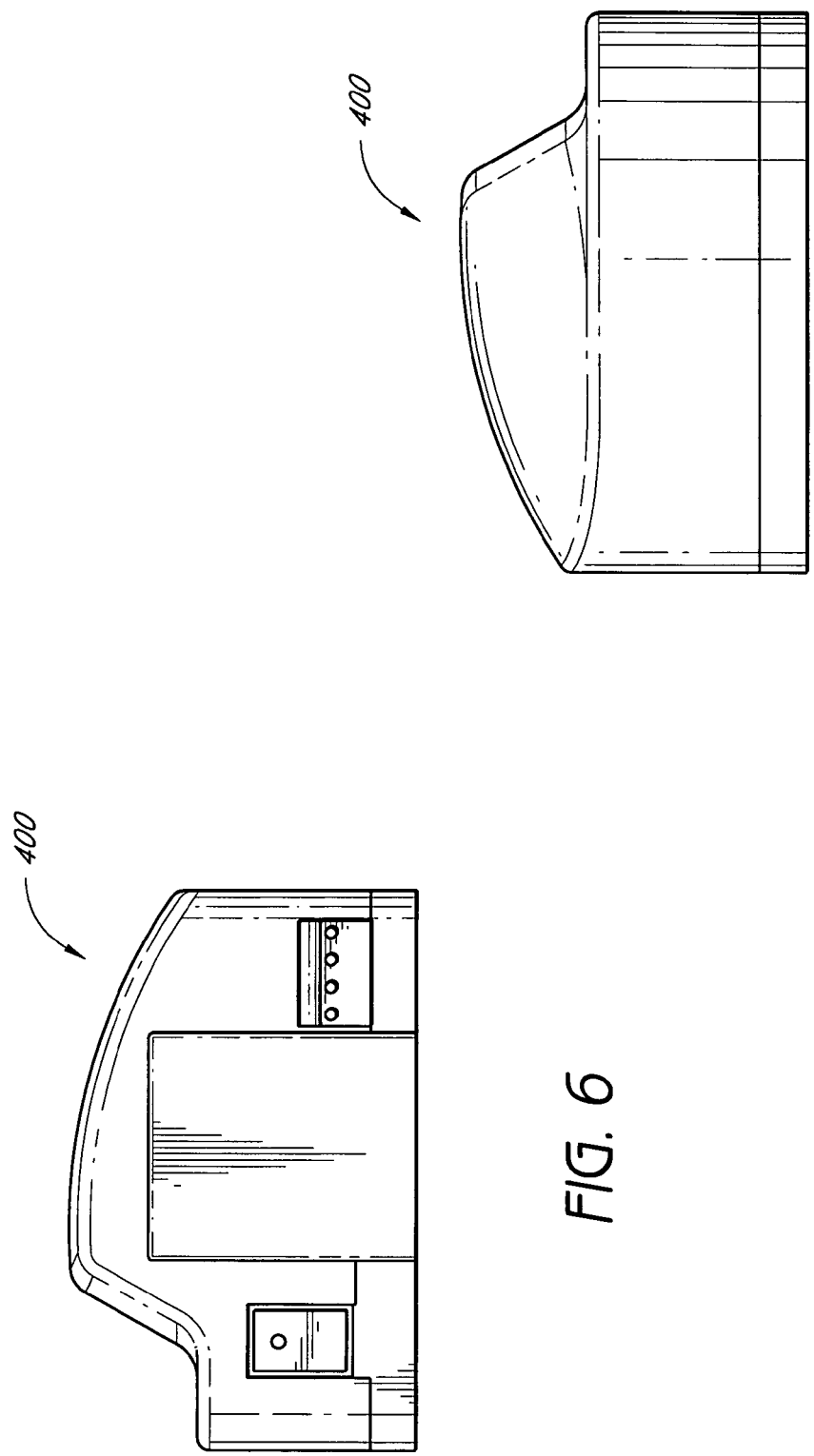

SYSTEMS AND METHODS FOR DETECTING AND CORRECTING A LEAK

BACKGROUND OF THE INVENTION

1. Field of the Invention

The present invention generally relates to systems designed to detect fluid leaks. More specifically, the present invention relates to systems designed to shut off a water supply to an appliance when a water leak is detected.

2. Description of the Related Art

Flooding in residential and commercial dwellings costs homeowners and insurance companies more than $100 million every year in the United States alone. For example, household flooding can be caused by bursting pipes or malfunctioning appliances, such as a washing machine or a dishwasher. The resultant flooding often causes damage to the surrounding environment as well as to the appliance itself.

For instance, flooding of laundry rooms is such a common occurrence that many housing codes now require washing machines to be positioned within catch basins. Thus, when the inevitable overflow occurs, it is hoped that the water will be contained within the catch basins and that the water will not flow into other regions of the laundry room. However, unless the manually operated shut-off valves, which are typically positioned behind most washing machines, are closed, water can surge unrestricted through a burst supply hose or can spill from the tank of the malfunctioning washing machine. It is estimated that the unrestricted water flow through the hoses or from the tanks can be approximately three gallons per minute. Clearly, in an unmonitored situation, the flow of water will rapidly exceed the storage capacity of a catch basin and can also exceed the capacity of a drain positioned within the catch basin.

In addition, toilets can be a source of flooding. Generally, toilets include both a float valve and a seal that stops the flow of water into the toilet. However, if the drain line becomes plugged, or if the float valve or seal malfunctions, water can spill from within the toilet bowl or the associated refill tank onto the floor. Furthermore, the toilet supply line can become loosened or can fail. In such instances, fresh water may surge onto the bathroom floor until the manually operated valve, which is typically located behind the toilet, is shut off. Thus, large amounts of water can flood a bathroom if the condition remains unmonitored or unrecognized.

SUMMARY OF THE INVENTION

In view of the above problems, a need exists for a system that automatically detects a fluid leak, such as, for example, a water leak from an appliance. Furthermore, a need exists for a system that automatically closes or restricts a supply line to the appliance when the leak is detected and that allows fluid flow once the leaked fluid has been removed.

Accordingly, one aspect of the present invention involves a system for automatically detecting and correcting a fluid leak. The system comprises a sensor, a valve module, an adjustable resistance device, feedback circuitry and a processor. The sensor is configured to provide a first voltage level when exposed to a fluid flowing from a fluid source and is further configured to provide a second voltage level when not exposed to the fluid. The valve module includes at least one valve that is selectively switchable between an open position to allow fluid flow from the fluid source and a closed position to substantially arrest fluid flow from the fluid source. The adjustable resistance device is configured to provide a voltage threshold. The feedback circuitry is configured to output a feedback voltage indicative of the position of the at least one valve. The processor is coupled to the sensor, the valve module, the adjustable resistance device and the feedback circuitry, and is configured to output a first control signal to cause the valve module to close the at least one valve when the sensor is providing the first voltage level and the feedback voltage has not attained the voltage threshold. The processor is further configured to output a second control signal to cause the valve module to open the at least one valve when the sensor is providing the second voltage level and the feedback voltage has not attained the voltage threshold.

Another aspect of the present invention involves a method for automatically detecting and restricting a fluid leak. The method includes receiving a first sensing signal from a sensor when the sensor detects a fluid and receiving a second sensing signal when the sensor does not detect the fluid, the second sensing signal being different from the first sensing signal. The method also includes receiving a reference voltage from an adjustable resistance device and receiving a feedback voltage indicative of a current flowing through a valve module coupled to a source for providing the fluid. The method further includes outputting a first control signal to the valve module to switch a motorized ball valve of the valve module from an open position, which allows flow of the fluid, to a closed position, which substantially arrests flow of the fluid, when receiving the first sensing signal and until the feedback voltage reaches the reference voltage.

Another aspect of the present invention involves an automatic leak detection and correction system. The system includes means for sensing a fluid flowing from a fluid source, wherein the sensing means outputs a first voltage when detecting the fluid and outputs a second voltage when not detecting the fluid. The system also includes means for selectively inhibiting fluid flow from the fluid source, the inhibiting means switchable between an open position to allow fluid flow and a closed position to inhibit fluid flow from the fluid source. The system further includes means for adjusting a threshold voltage and means for providing a feedback voltage indicative of the position of the inhibiting means. Moreover, the system includes means for controlling the inhibiting means, wherein the controlling means outputs a first control signal to cause the inhibiting means to close when the sensing means outputs the first voltage and the feedback voltage has not attained the threshold voltage, and wherein the controlling means outputs a second control signal to cause the inhibiting means to open when the sensing means outputs the second voltage and the feedback voltage has not attained the threshold voltage.

BRIEF DESCRIPTION OF THE DRAWINGS

These and other features, aspects and advantages of the present invention will now be described with reference to the drawings of certain preferred embodiments, which embodiments are intended to illustrate and not to limit the invention. The drawings comprise eleven figures.

FIG. 6 is a first side view of the control module of FIG. 5.

FIG. 7 is a second side view of the control module of FIG. 5.

DETAILED DESCRIPTION OF THE PREFERRED EMBODIMENTS

Figure 1:
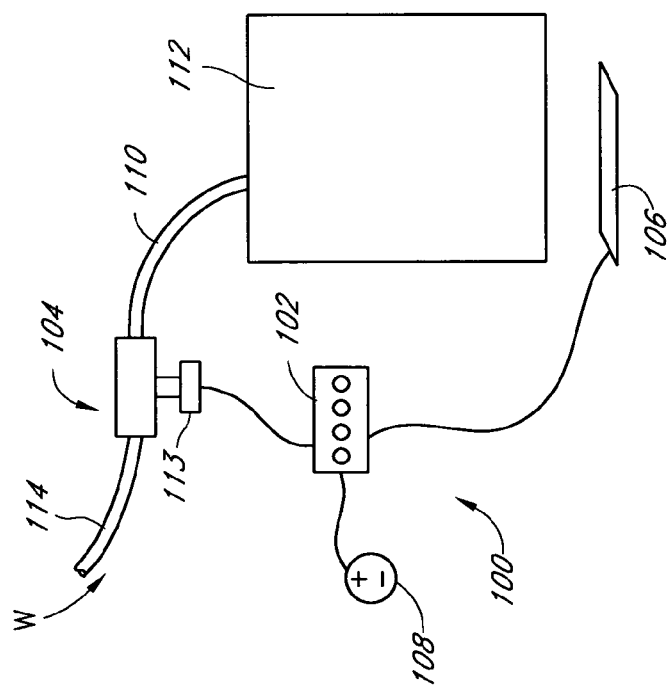
FIG. 1 is a schematic diagram of a leak detection and restriction system arranged and configured in accordance with certain features, aspects and advantages of the present invention.

With reference now to FIG. 1, a schematic diagram of a leak detection and restriction system 100 having certain features, aspects and advantages in accordance with the present invention is illustrated. The system 100 advantageously is capable of detecting fluid leaks and automatically taking corrective action in the event of such leaks. In certain embodiments, the illustrated system 100 generally is designed for household use to detect water leaks associated with general appliances. The system 100, however, can be used in a variety of other environments such as, for example, hotels, commercial buildings and the like. In addition, the system 100 can be modified to detect other types of fluid leaks, such as leaks comprising gases and/or liquids other than water.

In the illustrated arrangement, the system 100 comprises a control module 102 that communicates with a valve module 104 and a sensor 106. In general, when the sensor 106 detects a fluid leak, the control module 102 instructs the valve module 104 to close, thus restricting and/or substantially arresting the flow of the fluid.

The control module 102 is preferably electrically coupled to the valve module 104 such that data and/or control communication may take place therebetween. As illustrated, the control module 102 advantageously communicates with the valve module 104 through an electrical wire or cable. In other embodiments, the control module 102 may communicate with the valve module 104 via other wired or via wireless communication links. For example, in some other arrangements, the control module 102 communicates with the valve module 104 through infrared communication, radio frequency communication or the like.

The control module 102 is also preferably electrically coupled to the sensor 106. As shown, the control module 102 is coupled to the sensor 106 through an electrical wire or cable. In other arrangements, the control module 102 may communicate with the sensor 106 through other wired or wireless communication links, as described above. For example, the control module 102 and/or sensor 106 may include a transceiver for wireless communication of data and/or control signals.

Although only a single sensor 106 is illustrated in FIG. 1, the leak detection and restriction system 100 may include multiple sensors. For example, the control module 102 may be configured to communicate with multiple sensors, each associated with a different appliance. In other embodiments, multiple sensors may be coupled together to form an array of sensors for a single appliance. In yet other arrangements, the system 100 may include multiple control modules and/or multiple valve modules.

The illustrated control module 102 receives power from a power source 108 which can be AC and/or DC. For example, in one arrangement, the system 100 includes a 115 AC/9-volt DC adapter for engagement with a standard wall outlet. In another arrangement, the power source 108 comprises one or more batteries, such as a standard 9-volt battery or a plurality of 1.5-volt batteries, which advantageously provide for portability of the system 100 and/or for functioning during power outages. Of course, more than one power source 108 can be provided for use as a power backup, for example.

use, the system 100 preferably is positioned proximate a supply line 110 that is configured to transport a fluid from and/or to an appliance 112. In some arrangements, the appliance 112 is a washing machine to which the supply line 110 transports water. In other arrangements, the appliance 112 can be a dishwasher, a water heater, a toilet, a sink, a refrigerator, an ice maker, a water filter or the like. As shown, the valve module 104 is preferably positioned along the supply line 110.

More preferably, in arrangements in which the supply line 110 is a hose connected to a plumbed line 114 including a wall spigot, the valve module 104 is directly connected to the plumbed line 114 at the wall spigot and is interposed between the plumbed line 114 and the supply line 110. By directly attaching the valve module 104 to the plumbed line 114 (which is generally copper or galvanized metal), the valve module 104 is advantageously positioned upstream of a rubber or elastomeric hose that could rupture under normal everyday use.

The valve module 104 comprises one or more valves 113 that are capable of being opened and/or closed without manual intervention. In arrangements for use with appliances such as washing machines, the valve module 104 may include multiple valves such that one valve can be used for each water supply line (e.g., one hot water line and one cold water line). Of course, the number of valves can vary according to the number of supply lines being monitored. In addition, while an embodiment of the present invention is being described in the context of supply lines, other embodiments of the present invention also can be used with drain lines and transfer lines, as well.

In certain arrangements, the illustrated valve 113 includes one or more automatic valves. For example, in certain preferred embodiments, the valve module 104 comprises one or more motor valves, such as a motorized fill-port ball valve, having a DC motor and associated gear box to rotate the ball valve between both opened and closed positions. In yet other arrangements, the valve module 113 may include a 9-volt DC magnetic latching valve, such as a 0.375 inch magnetic latching valve capable of installation on a water supply line.

As will be understood from the description below, the one or more valves 113 are preferably of the "normally open" type, which allow water to flow until the valve is triggered to close. Of course, the valve can be constructed to open and close and to remain in either position depending on the surrounding circumstances. For instance, the valve 113 may toggle from open to closed through a single application of power. In addition, in some arrangements, the valves may be of the "normally closed" type and can be driven to the open state only so long as power is applied. In such an arrangement, if the power supply is removed (e.g., power outage or drained battery), the fluid flow is advantageously interrupted such that leaks during power outages can be obviated.

The sensor 106 is configured to form a closed circuit when a fluid, such as a conductive liquid contacts the surface of the sensor 106. Preferably, the sensor 106 is located proximate a water connection or hose where the sensor 106 is most likely to be contacted by leaking water. For example, the sensor 106 may comprise a strip sensor that is advantageously placed on a surface beneath the appliance 112. Contact of the sensor 106 with water acts to close a circuit, which is described in more detail below. When the circuit is closed, the control module 102 activates an alarm and/or activates the valves 113 of the valve module 104 to stop the flow of water to and/or from the appliance 112. In one arrangement, the sensor 106 is a tin-lead or zinc-coated copper sensor or other type of sensor that may be used with certain features, aspects and advantages of the present invention.

Figure 2:
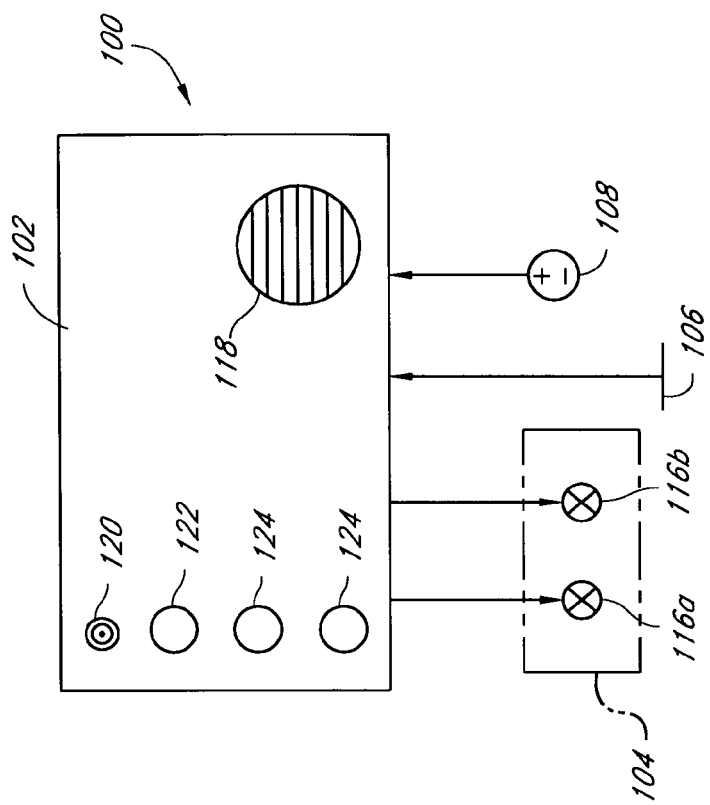
FIG. 2 is a schematic diagram of a control module of the leak detection and restriction system of FIG. 1.

With reference now to FIG. 2, further details of the control module 102 are illustrated. The control module 102, as discussed above, preferably connects to a sensor 106 and to a valve module 104. In certain arrangements, the control module 102 advantageously includes one or more processors that communicate with the sensor 106 and/or the valve module 104. For example, such a processor may be mounted on a printed circuit board within the control module 102.

In certain arrangements, the processor of the control module 102 includes a general purpose microprocessor or microcontroller or a purpose specific microprocessor or microcontroller configured to receive a signal from the sensor 106 when the sensor 106 detects a leak. The processor then outputs a control signal to the valve module 104 to restrict fluid flow between the supply line 110 and the plumbed line 114. In certain preferred arrangements, the processor includes a flash-based, 8-bit CMOS PIC16FC627A microcontroller manufactured by Microchip Technology, Inc.

Furthermore, the processor of the control module 102 may comprise one or more modules configured to execute on one or more processors. The modules may comprise, but are not limited to, any of the following: hardware or software components such as object-oriented software components, class components and task components, processes, methods, functions, attributes, procedures, subroutines, segments of program code, drivers, firmware, microcode, applications, algorithms, techniques, programs, circuitry, data, databases, data structures, tables, arrays, variables, combinations of the same or the like.

With continued reference to FIG. 2, the control module 102 may communicate with a plurality of valves, which may be included in one or more valve modules. For example, the number of connecting lines between the control module 102 and the valve module 104 can match the number of valves 116 used in the valve module 104. For instance, a first line can extend to a hot water valve 116a while a second line can extend to a cold water valve 116b. In such a configuration, a sensor, such as a temperature sensor, may be included to determine the source of a particular leak among one of a plurality of fluid sources.

The illustrated control module 102 also preferably comprises an alarm 118 and a visual indicator 120. The indicator 120 can comprise a light emitting diode (LED) or the like. In some arrangements, when a leak has been detected, the alarm 118 may emit an audible alert, such as, for example, through a speaker, a piezo alarm or other audible energy source. The visual indicator 120 can be used to display, for instance, a system-ready status, a strength of a power supply (e.g., battery) and/or an alarm status. In the presently preferred arrangement, the indicator 120 alerts the user that the system 100 is functioning. In other arrangements, the alarm 118 and/or the visual indicator 120 can be powered by a power supply that is separate from that powering the detection circuitry (e.g., power supply 108).

With continued reference to FIG. 2, the illustrated control module 102 comprises a reset button 122 usable to manually to reset the system 100 after a leak has been detected. In addition, the illustrated control module 102 includes manual activation buttons, or trigger buttons, 124 usable to manually shut off and/or allow fluid flow through the valves 116a, 116b. These activation buttons 124 may be used, for example, for preventative maintenance of the system 100. In some environments of use, so-called hard water circulates through the valves 116a, 116b. In such environments, the illustrated valves 116a, 116b can be manually cycled to clean the valves of scale and other mineral deposits. By periodically cycling the valves 116a, 116b, the life expectancy of the valves 116a, 116b may be increased. The control module 102 also can be programmed to automatically cycle the valves 116a, 116b on a regular basis, such as every month.

Figure 3:
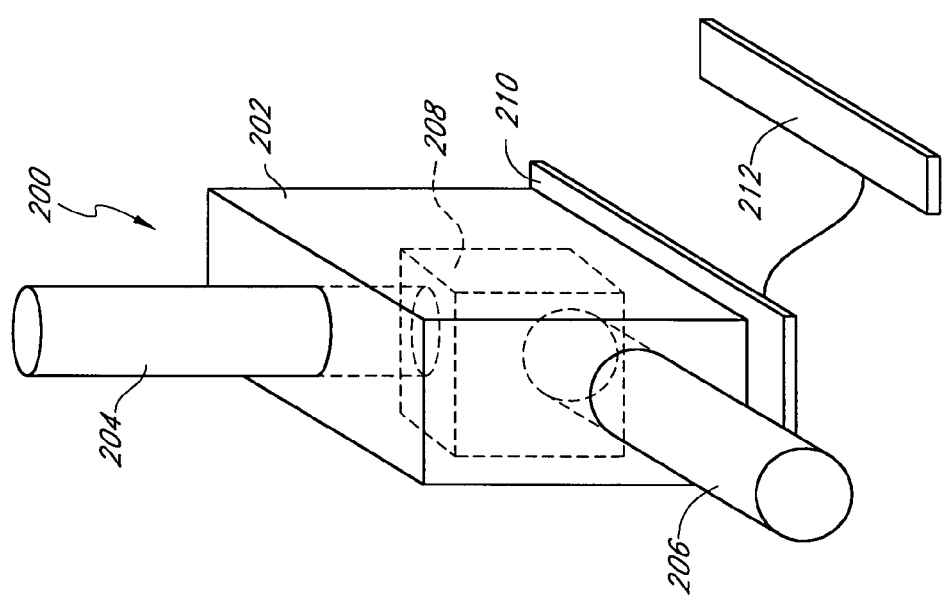
FIG. 3 is a schematic diagram of an integrated control module of another embodiment of a leak detection and restriction system.

With reference now to FIG. 3, another embodiment of a leak detection and restriction system 200 is illustrated therein. The system 200 generally comprises the same components as the system 100 described above.

One difference between the two systems, however, lies in the integrated construction of the system 200 relative to the construction of the system 100. The system 200 generally contains each component within a single housing 202. Preferably, the system 200 also contains a power cell, such as a battery, within an easily accessed battery compartment. In this manner, the system 200 is self-contained and can be maintained without removing the system 200 from its inline position along a supply line. In addition, by including a battery, the water flow is not positioned in close proximity to a standard household power supply line.

With respect to the illustrated arrangement of FIG. 3, water flows in through a water inlet 204 and out through a water outlet 206. A valve 208, such as a motorized ball valve, is interposed between the inlet 204 and the outlet 206. The valve 208 and an associated control module 210, therefore, are integrated into a single unit. Of course, more than one valve 208 can be included in the system 200, and the system 200 can control any number of valves separately or together. A sensor 212 is preferably remotely located from the housing 202 but can be integrated into the housing 202 in some arrangements.

Figures 1, 4:
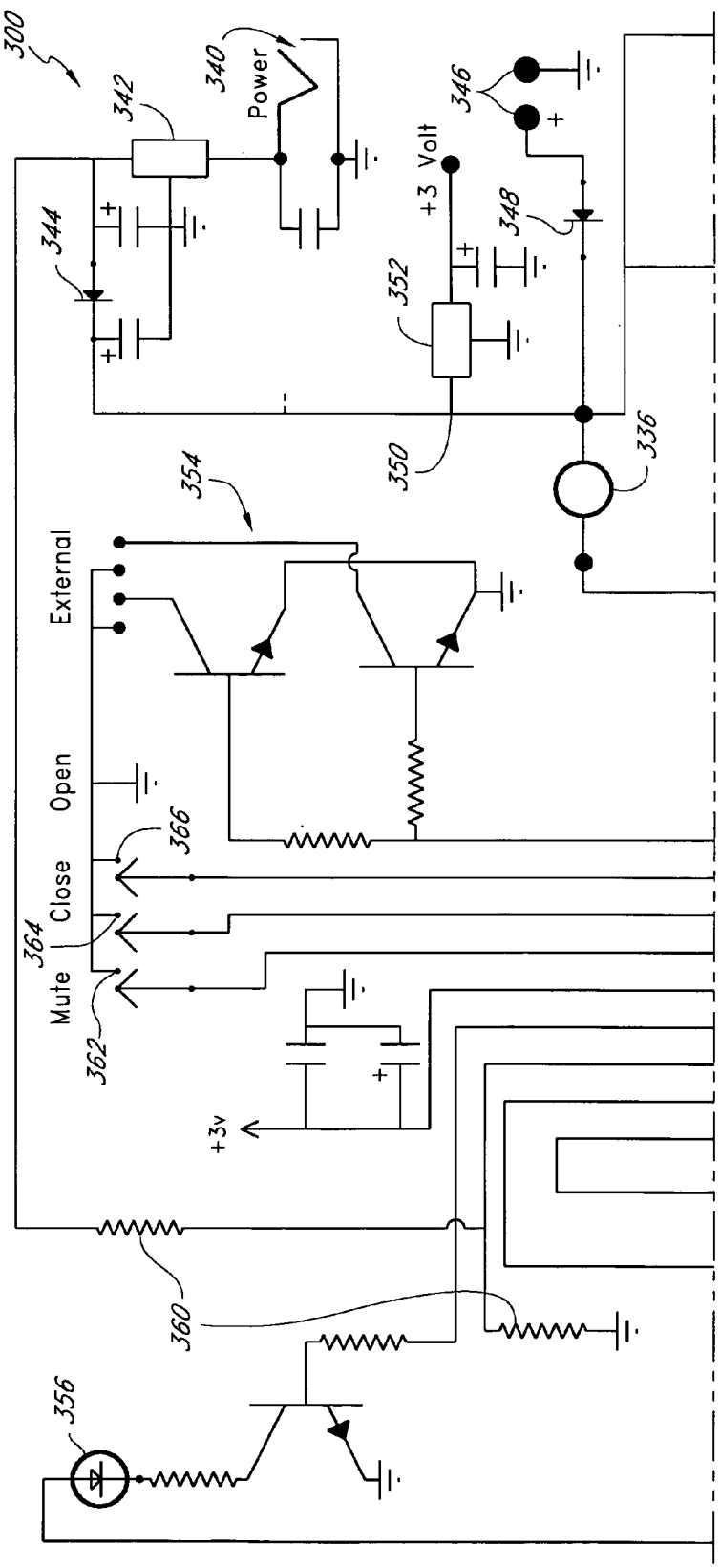
FIG. 4 is a schematic diagram of an exemplary embodiment of control circuitry usable with the leak detection and restriction system of FIG. 1.
Figures 2, 4:
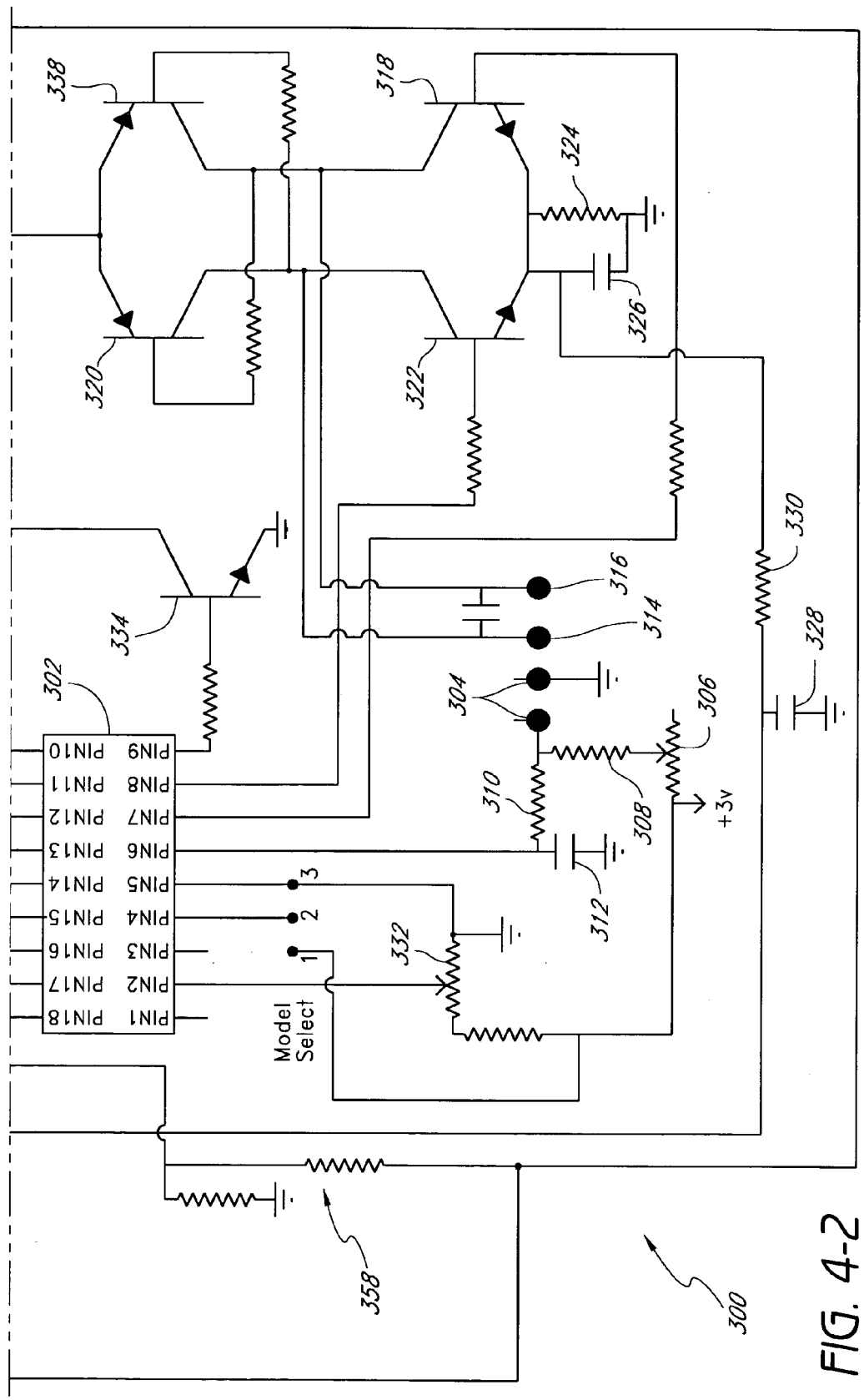

FIG. 4 illustrates a schematic diagram of an exemplary embodiment of control circuitry 300 usable with the leak detection and restriction systems 100 and 200 to implement certain features, aspects and advantages in accordance with the present invention. In particular, the illustrated control circuitry 300 is configured to control a valve module, such as the valve module 104, to selectively restrict the flow of a fluid. For example, the control circuitry 300 may arrest the flow of a fluid when a leak, is detected by a sensor, such as the sensor 106, in communication with the control circuitry 300.

As shown, the control circuitry 300 comprises a processor 302 configured to receive input regarding detection of a leak and to output signals to control one or more valves for regulating fluid flow. In the depicted arrangement, the processor 302 includes a flash-based, 8-bit CMOS PIC16F627A microcontroller manufactured by Microchip Technology, Inc., and is configured to execute software instructions for monitoring leak detection inputs for controlling the valve-control outputs. In other arrangements, the processor 302 may include one or more general purpose or application specific microprocessors, as discussed above.

With continued reference to FIG. 4, the functions and electrical connections between the various components of the control circuitry 300 will now be described. As shown, the processor 302 includes a plurality of input and output pins, which are labeled PIN1-PIN18. When power is applied to the processor 302, the processor 302 examines PIN4 to determine the type of fluid restriction apparatus (e.g., valve) in communication with the control circuitry 300. For example, the processor 302 may determine if a magnetic latching valve or a motor-controlled valve, such as a ball valve, is in communication with the processor 302.

The processor 302 communicates with a sensor, such as sensor 106, that is coupled to sensor contacts 304. When the sensor is not detecting a leak, an open circuit exists between the two sensor contacts 304, and PIN6 of the processor 302 is held high (e.g., approximately three volts) though the use of a sensitivity trim potentiometer 306 and resistors 308 and 310. As shown, the resistor 310 and a capacitor 312 are further used to filter noise transients from the sensor contacts 304.

When the sensor detects a leak, such as by coming in contact with water, the sensor effectively creates a conductive path between the sensor contacts 304 and reduces the voltage at PIN6 of the processor 302. When this voltage drops below a particular voltage threshold, the processor 302 outputs a signal to close one or more valves, which are preferably in electrical communication with a first output pin 314 and a second output pin 316.

To close the one or more valves, the illustrated processor 302 places three volts on PIN7 to turn on first and second transistors 318 and 320, which, in turn, place approximately 5.5 volts on the collector of a third transistor 322 and the first output pin 314. The output voltage differential between the first output pin 314 and the second output pin 316, which is at approximately zero volts, causes the attached valve to close. For example, the output voltage differential may cause a motor to turn a ball valve to restrict flow of the leaking fluid source. In other embodiments, the voltage differential may energize a coil to cause a magnetic latch to switch closed.

In addition, when the processor 302 determines that there is a fluid leak, the processor 302 may output one or more signals to alert a user that a leak as occurred. For example, the processor 302 may output a voltage at PIN9 to turn on transistor 334 and allow for current flow through the alarm 336. The alarm 336, for example, may comprise a speaker or a piezo alarm configured to emit an audible signal and/or a light-emitting device configured to emit a visual signal. In yet other embodiments, the processor 302 may be in communication with a remote monitoring unit that alerts a user that a leak has occurred.

When the attached valve reaches a closed position, the electrical path between output pin 314 and output pin 316 closes and the current flowing therebetween increases sharply. This increased current causes an increase in a sense voltage across sensing resistor 324 which voltage is then integrated by capacitors 326 and 328 and resistor 330 to be fed into PIN17 of the processor 302. The sense voltage at PIN17 is compared by the processor 302 with a reference voltage at PIN2, which reference voltage is determined in part by potentiometer 332. If the sense voltage on PIN17 is greater than the reference voltage on PIN2, the processor 302 then outputs a signal to shut off the voltage on PIN7.

In certain arrangements, the potentiometer 332 is adjusted to advantageously provide a reference voltage of approximately 300 millivolts. In such arrangements, the processor 302 is configured to shut off voltage on PIN7, and to the attached valve motor or latch, when the valve motor or latch draws approximately 300 milliamps. In yet other embodiments, the potentiometer 332 may be adjusted to increase or decrease the reference voltage depending on the type and/or size of valve motor or latch in communication with the output pins 314 and 316. That is, increasing the reference voltage allows for a greater current to flow through the motor or latch and of the valve before the processor 302 shuts off the voltage at PIN7.

After the restriction valve has been closed, the processor 302 monitors the voltage at PIN6 to determine if the sensor continues to detect a fluid leak. For example the illustrated processor 302 may monitor PIN6 for an increase in the voltage to approximately three volts, signifying an open circuit between the sensor contacts 304. When the processor 302 determines from the sensor that the leaked fluid is no longer present (e.g., removed or dried up), the processor 302 may shut off any warning signals and may return to normal sensing operation.

In yet other arrangements, when the leaked fluid has been removed, the processor 302 may automatically return to normal sensing operations but may continue emit an alarm until the user manually shuts down the alarm. Such embodiments allow for the automatic opening and closing of the valve but provide the user with an alert that a leak is occurring or has occurred.

To resume normal sensing operation, the processor 302 places three volts on PIN8 to turn on the third transistor 322, which drops the voltage at the first output pin 314 to near ground. Fourth transistor 338, in turn, turns on to place approximately 5.5 volts on the first transistor 318 and the second output pin 316. The output voltage differential between the first and second pins 314, 316 then causes the attached latch or motor to open the associated valve.

When the valve reaches the end of its rotation (e.g., to a substantially "open" position), the current through the valve motor or latch increases sharply. At this point, the increased sense voltage across sensing resistor 324, is integrated by capacitors 326 and 328 and resistor 330 and fed into PIN17 of the processor 302. This sense voltage at PIN17 is compared by the processor 302 with the reference voltage at PIN2 of the processor, which reference voltage is determined in part by potentiometer 332. If the sense voltage on PIN17 is greater than the reference voltage on PIN2, the processor 302 then outputs a signal to shut off the voltage on PIN8, thus stopping the opening of the valve.

The illustrated processor 302 and associated circuitry may be advantageously powered though one or more batteries and/or through a power pack 340. For example, the power pack 340 may provide power through a 3.5 mm jack to a voltage regulator 342 that is configured to output a substantially constant six volts. In certain embodiments, the power pack 340 may comprise an AC-to-DC converter that is capable of being plugged into a wall outlet. As shown, a diode 344 is further used with the power circuitry to prevent a battery voltage from battery terminals 346 from backfeeding the regulator 342.

In addition to, or in place of the power pack 340, the processor 302 and associated circuitry may utilize battery power. For example, four 1.5 volt alkaline batteries (e.g., AA batteries) may be coupled in series across the battery terminals 346 to produce a six-volt source, which is then fed through diode 348. Similar to diode 344, diode 348 prevents backfeed from the power pack 340.

The voltage (e.g., six volts) present at junction 350, which voltage may be produced by the power pack 340 and/or the battery source, is then fed to a voltage regulator 352 to supply the processor 302 and associated circuitry. In certain arrangements, the voltage regulator 352 comprises a three-volt low-drop-out (LDO) regulator.

When in normal operation, the processor 302 outputs three volts on PIN10 to turn on transistors 354, which act as a switch for external circuitry. The processor 302 also provides three volts on PIN15 to illuminate a status LED 356, which informs a user that the circuit is in a normal operating condition. To save energy, the processor 302 may advantageously periodically place the three volts on PIN15, such as for approximately 124 milliseconds every six seconds, to cause the LED 356 to flash.

Furthermore, the illustrated control circuitry 300 advantageously includes a means for providing a low-battery signal. As shown, resistors 358 form a voltage divider to produce a voltage at PIN18 that is compared to an internal voltage of the processor 302. When the battery voltage drops below a particular threshold (e.g., approximately 4.2 volts) the processor 302 sounds a low-voltage alarm by turning on transistor 334, which in turn activates the alarm 336.

Resistors 360 also form a voltage divider for the six volts provided through the voltage regulator 342. The resulting reduced voltage due to the resistors 360, which voltage is applied to PIN16, may be used by the processor 302 to determine if batteries are being used by the control circuitry 300. If batteries are not being used, the processor 302 may be configured to disable the battery low-voltage error signals.

FIG. 4 further illustrates three input devices that may be accessed by the user to control operations of the associated leak detection and correction system. As shown, a "MUTE" input 362 is coupled to PIN13 of the processor 302. The MUTE input 362 may be activated by the user to turn off an alarm that has been sounded, such as when a leak has been detected.

A "CLOSE" input 364 and an "OPEN" input 366 are coupled, respectively, to PIN12 and PIN11 of the processor 302. The CLOSE and OPEN inputs 364, 366 may be activated by the user to manually control the opening and/or closing of the attached valve. In certain arrangements, the processor 302 prevents the user from opening the valve through the OPEN input 366 if the associated sensor is still in contact with the leaked fluid. In such arrangements, the user must dry and/or remove the sensor before activating the OPEN input 366.

Furthermore, in certain arrangements, the processor 302 may be configured to periodically close and open the valve for a short period of time in order to maintain the integrity of the system. For example, the processor 302 may close the valve once every thirty days for approximately 0.5 second to, for instance, prevent calcium, or other material, build up on the valve. In such embodiments, the LED 356 may "blip" once approximately every six seconds when the valve is open and twice approximately every six seconds when the valve is closed.

Figure 5:
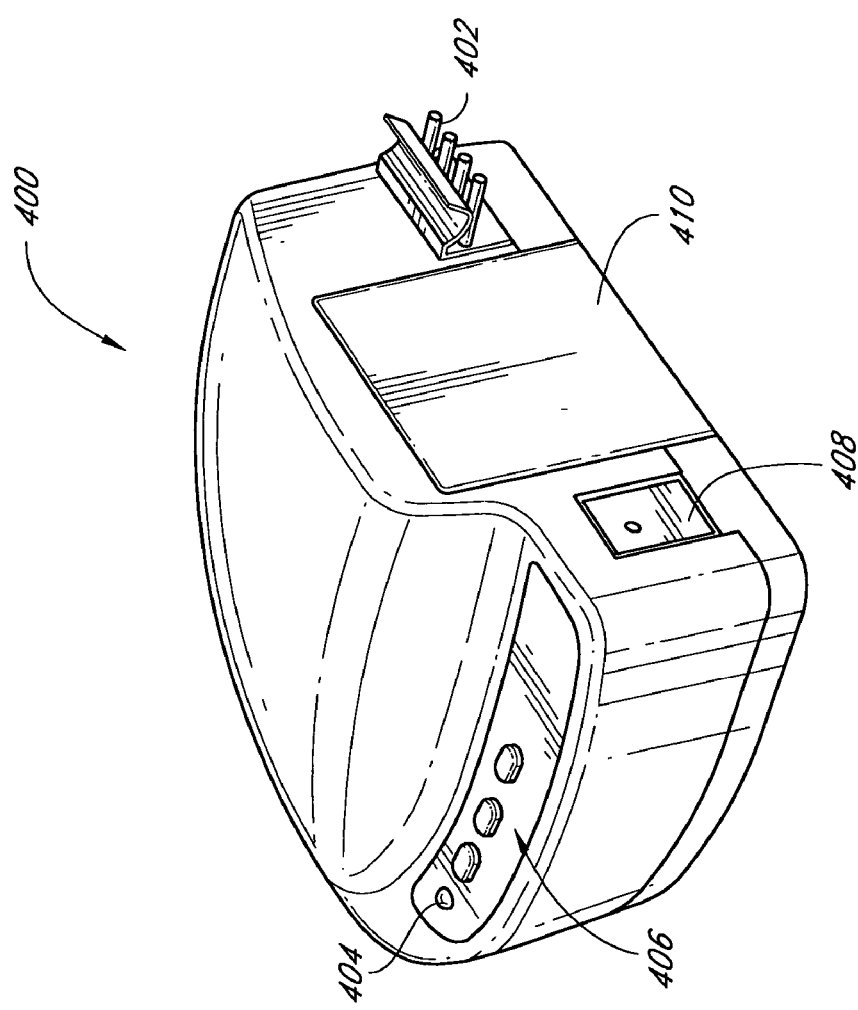
FIG. 5 is a perspective view of an exemplary embodiment of a control module of the leak detection and correction system of FIG. 1.
Figure 9:
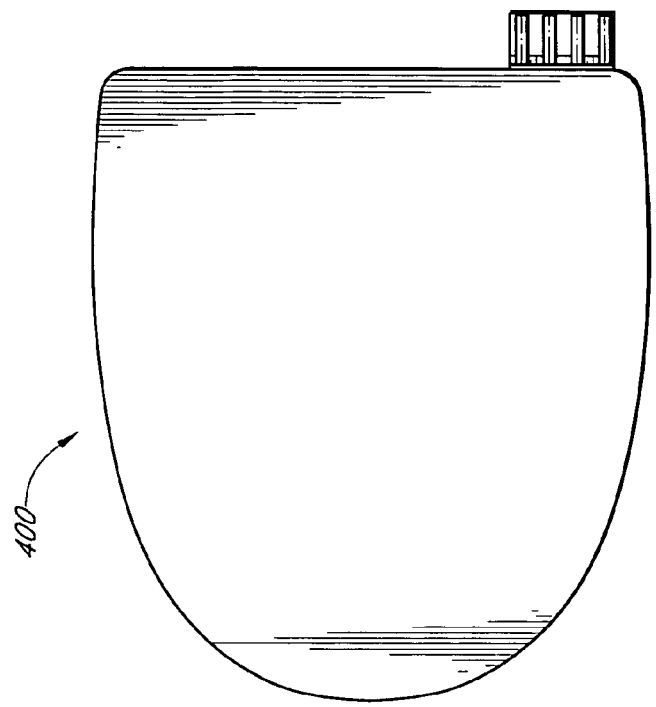
FIG. 9 is a bottom view of the control module of FIG. 5.
Figure 8:
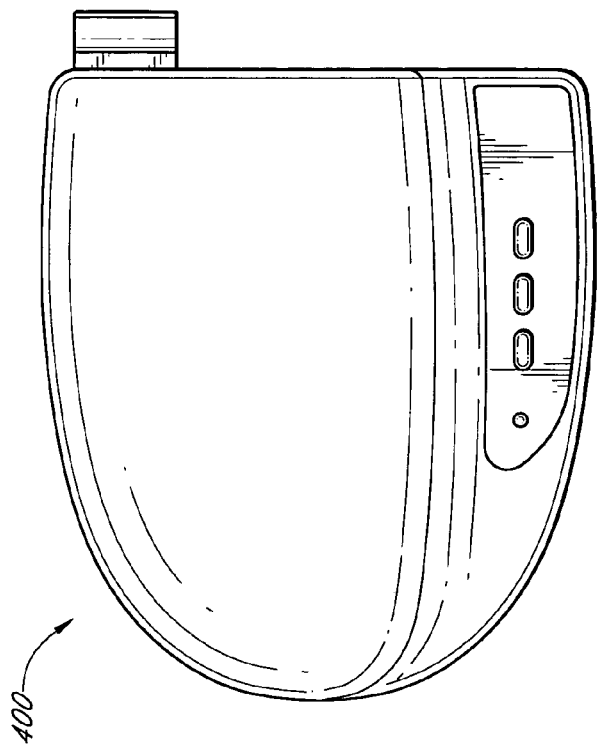
FIG. 8 is a top view of the control module of FIG. 5.
Figure 11:
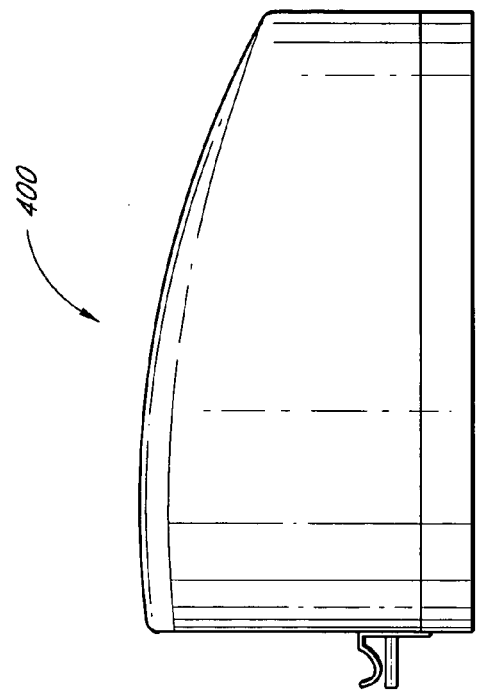
FIG. 11 is a rear view of the control module of FIG. 5.
Figure 10:
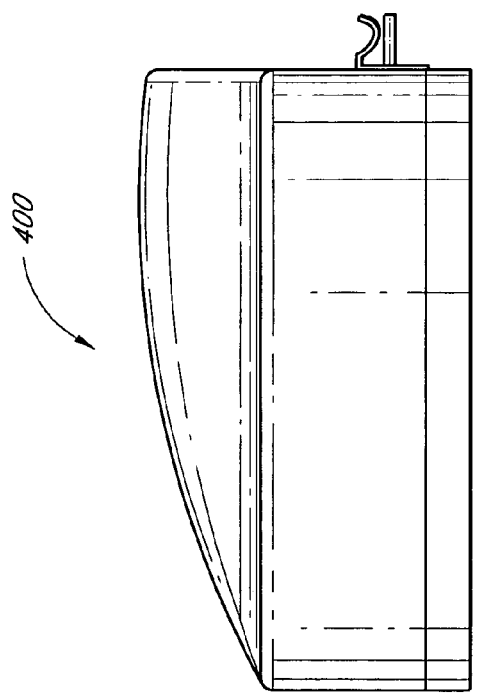
FIG. 10 is a front view of the control module of FIG. 5.

FIG. 5 illustrates a perspective view of a control module 400 for a leak detection and correction system according to certain embodiments of the invention. In certain arrangements, the control module 400 functions similarly to the control module 102 described above and/or may include circuitry similar to the control circuitry 300 of FIG. 4.

As shown, the control module 400 includes a connector port 402 for communication with a sensor and/or a valve, an LED 404 for communicating information to a user, command buttons 406 for receiving input from a user, and a power supply port 408. The control module 400 further includes a battery compartment 410 configured to hold multiple batteries for powering at least a portion of the control module 400. FIGS. 6-11 illustrate additional views of the control module 400 of FIG. 5.

During general operation, the illustrated control module 400 may be mounted in several different ways. For example, the control module 400 may be removably attached to a substantially flat surface, such as a wall or a side of an appliance, through a VELCRO® strip. In other arrangements, the control module 400 may be fastened to a surface through a mounting frame and/or bolts or screws.

Figure 12:
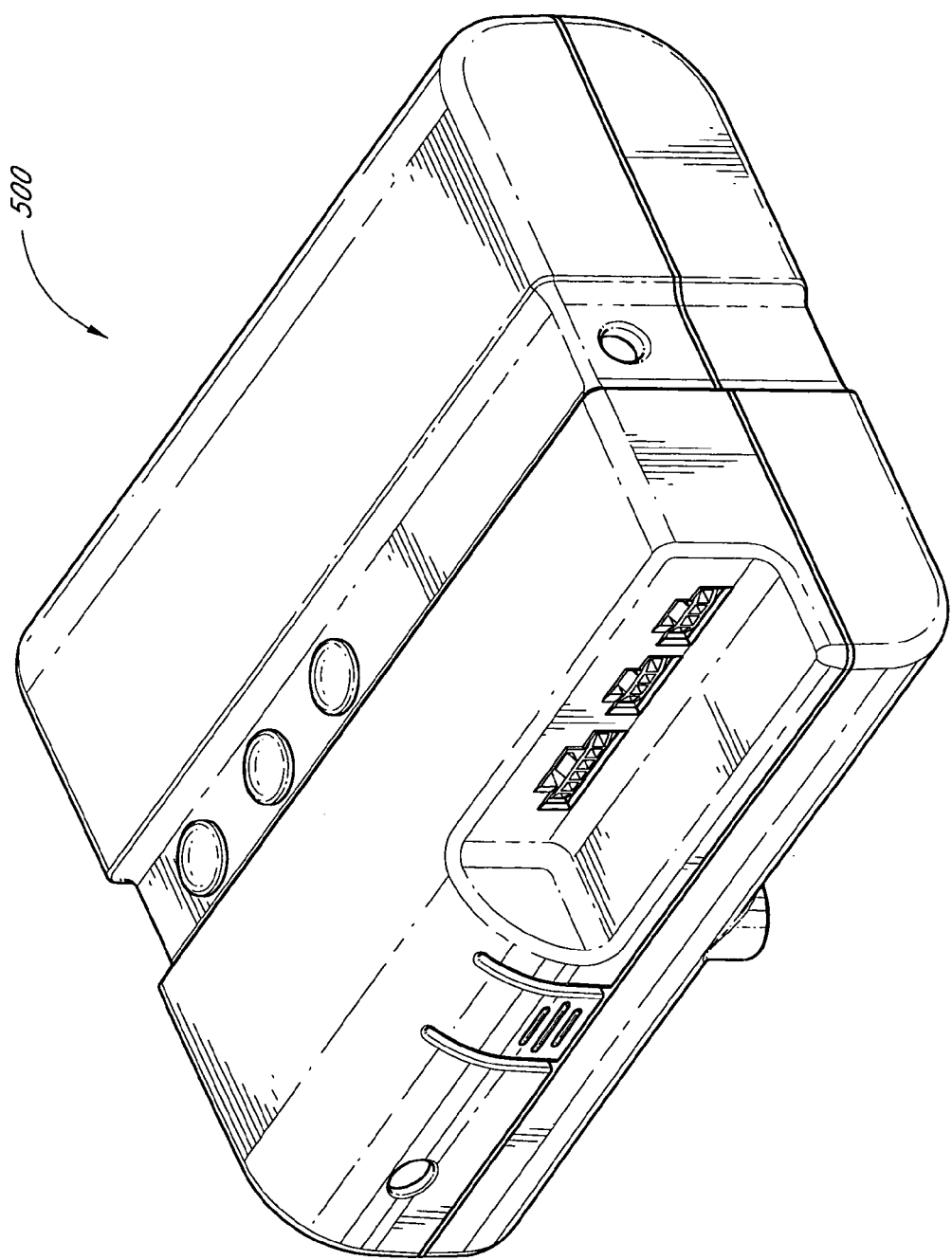
FIG. 12 is a perspective view of an exemplary embodiment of another control module usable with the leak detection and correction system of FIG. 1.
Figure 13:
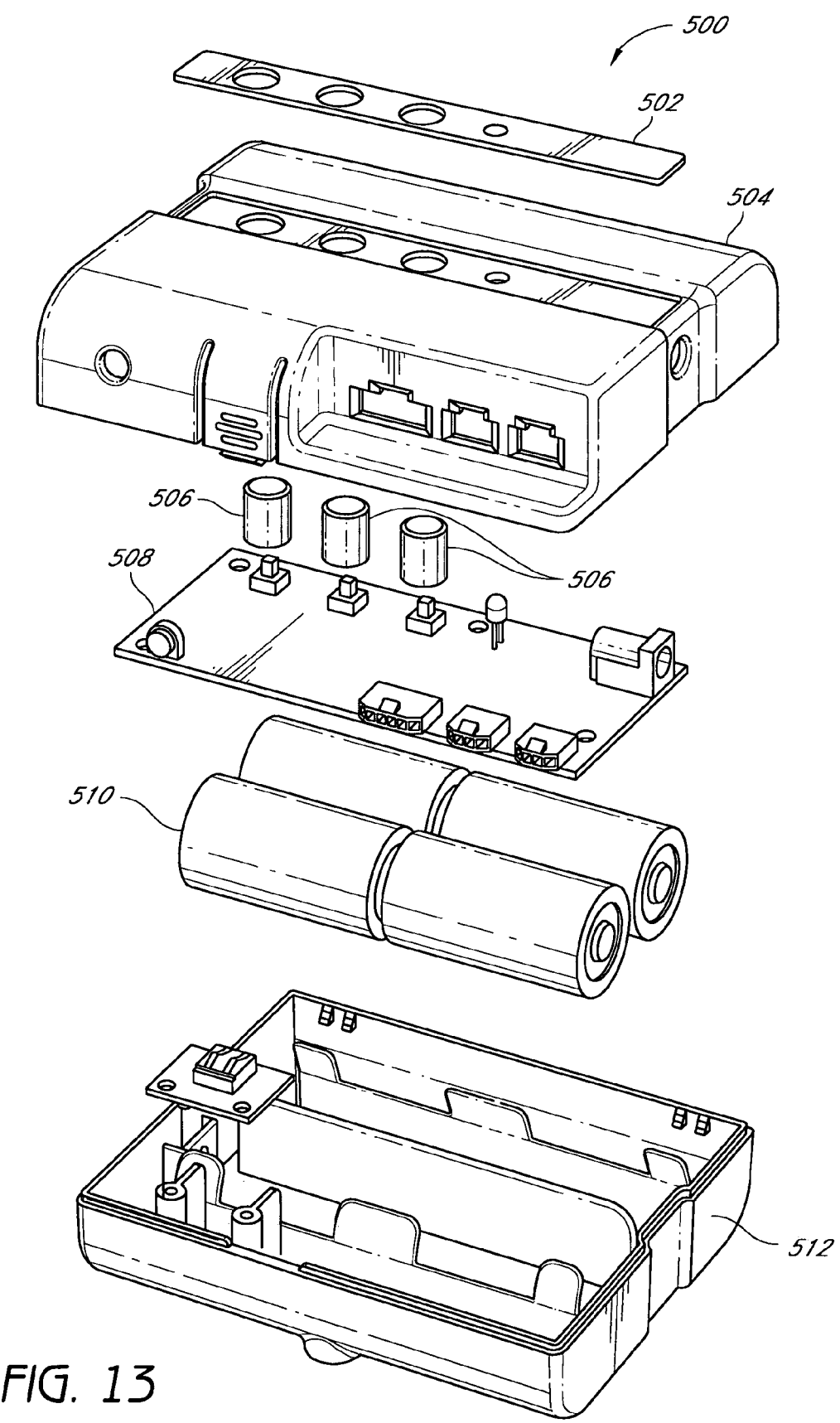
FIG. 13 is an exploded view of the control module of FIG. 12.
Figure 14:
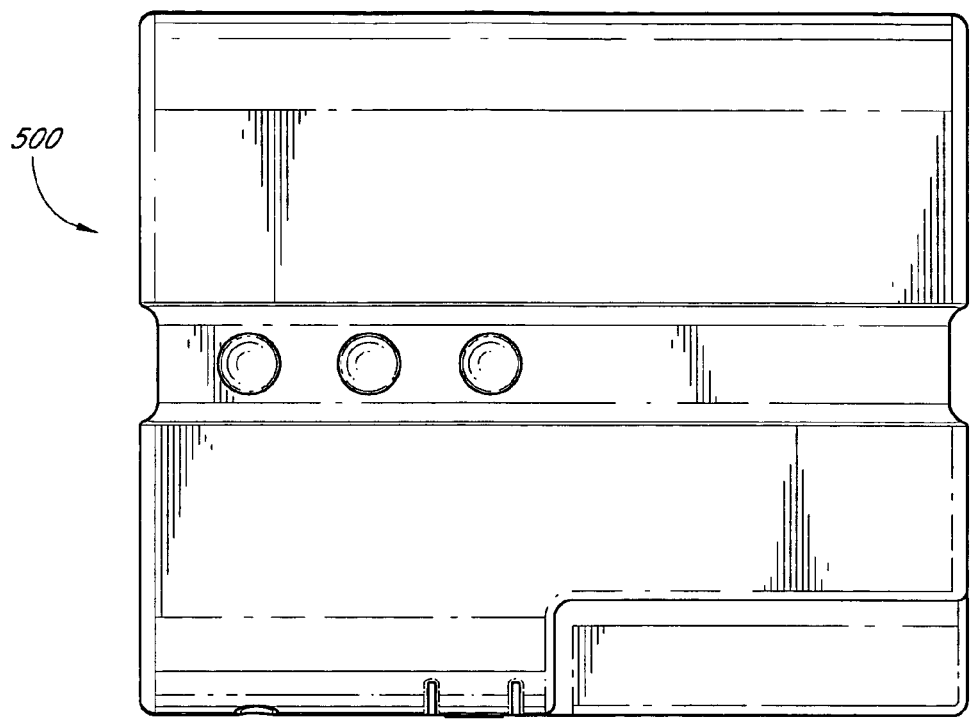
FIG. 14 is a top view of the control module of FIG. 12.
Figure 15:
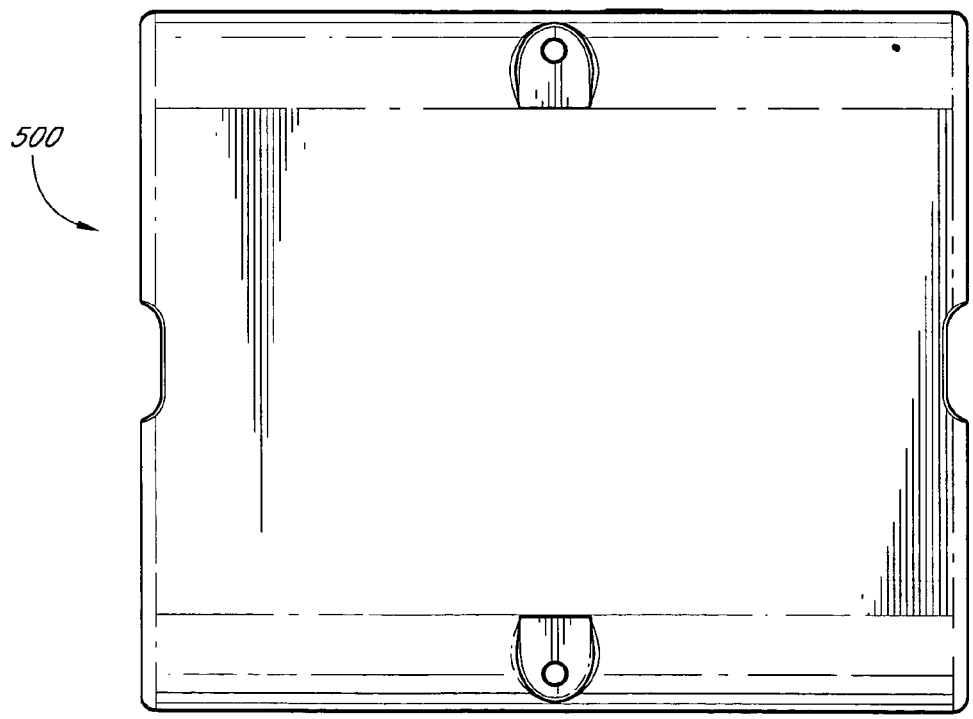
FIG. 15 is a bottom view of the control module of FIG. 12.
Figure 16:
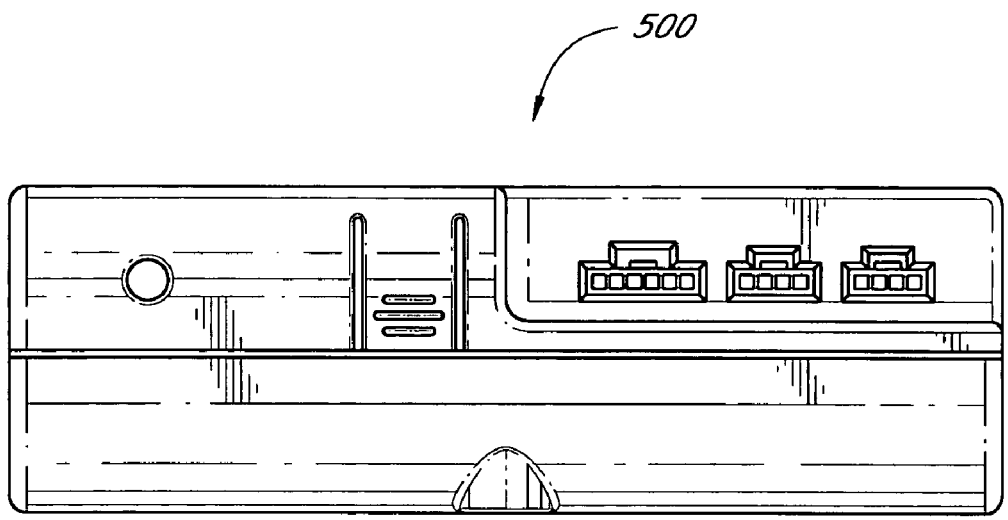
FIG. 16 is a front view of the control module of FIG. 12.
Figure 17:
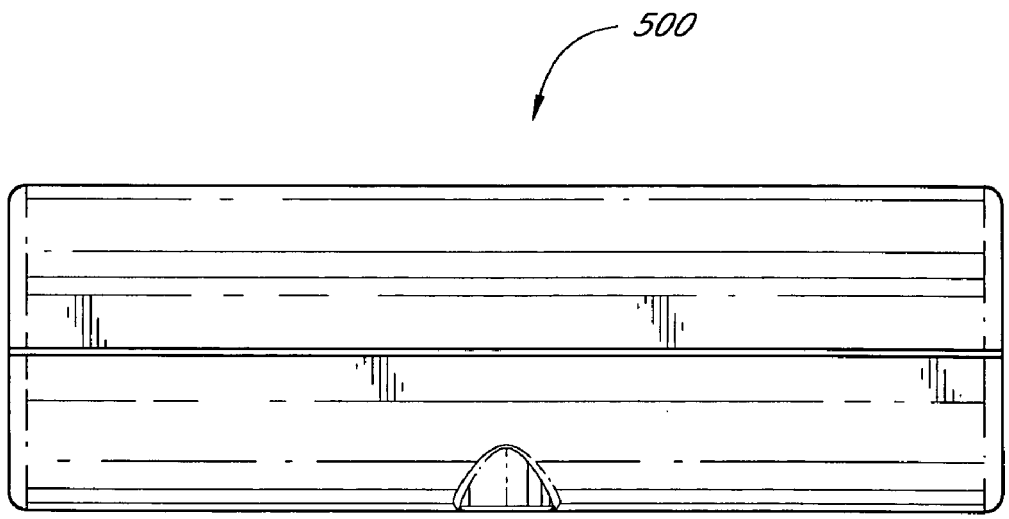
FIG. 17 is a rear view of the control module of FIG. 12.
Figure 18:
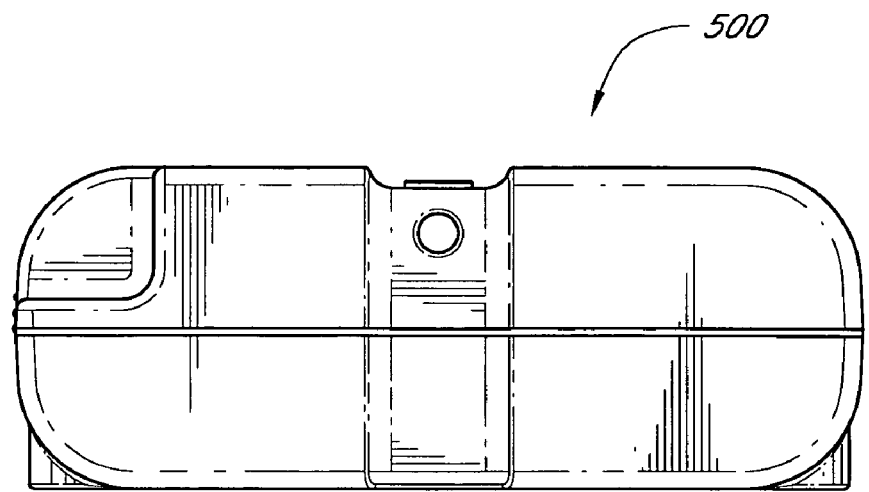
FIG. 18 is a first side view of the control module of FIG. 12.
Figure 19:
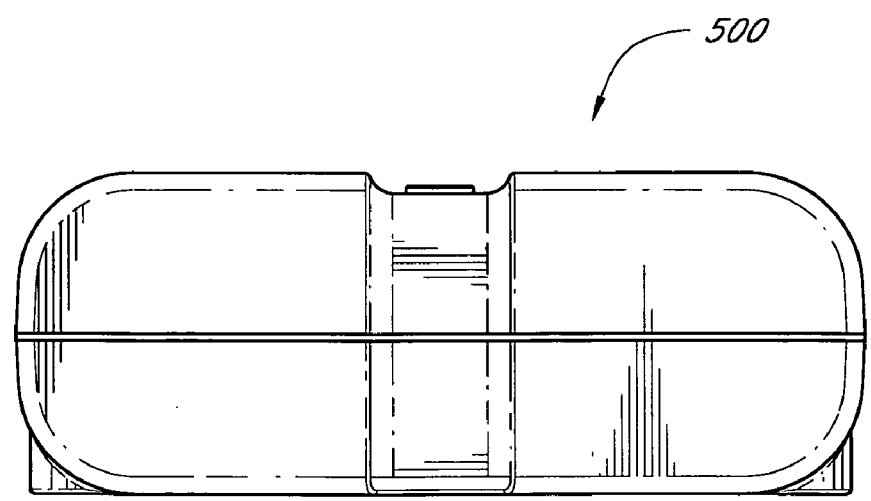
FIG. 19 is a second side view of the control module of FIG. 12.

FIGS. 12-19 illustrate another embodiment of a control module 500 usable with a leak detection and correction system, such as the leak detection and correction system 100 of FIG. 1. In particular, FIG. 12 illustrates a perspective view of the control module 500, and FIG. 13 illustrates an exploded view of the control module 500. The illustrated control module 500 includes a face plate 502, a top cover 504, actuators 506, a circuit board 508, batteries 510 and a bottom cover 512.

In certain arrangements, the control module 500 functions similarly to the control module 102 and/or the control module 400 described above. For instance the circuit board 508 may include circuitry similar to the control circuitry 300 illustrated in FIG. 4. FIGS. 14-19 illustrate additional views of the control module 500.

Figure 20:
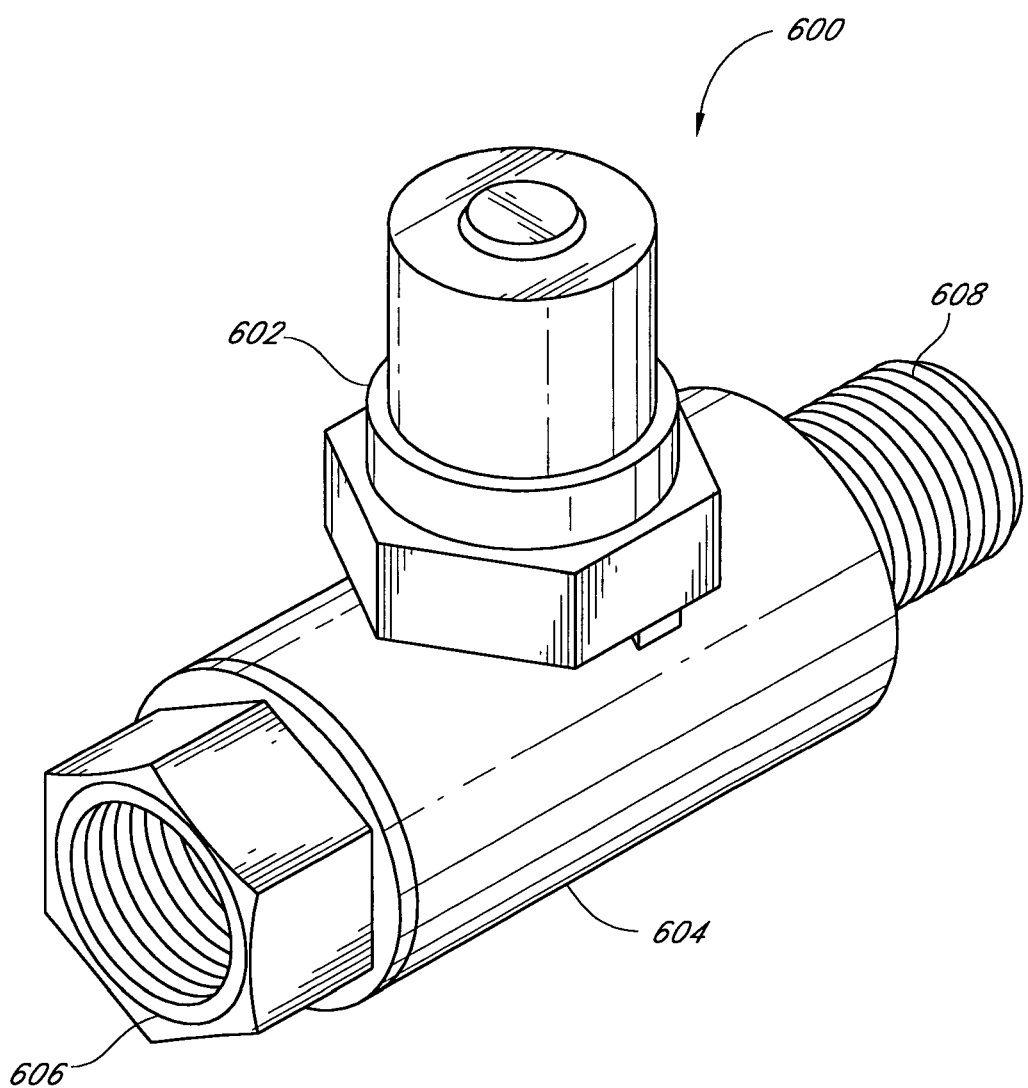
FIG. 20 is a perspective view of an exemplary embodiment of a ball valve usable with the leak detection and correction system of FIG. 1.

FIG. 20 illustrates an embodiment of a ball valve 600 usable with the leak detection and correction systems described herein. The illustrated ball valve 600 includes a valve control portion 602 and a valve body 604. In certain arrangements, the valve control portion 602 includes a motor and/or an associated gear assembly to drive a two-way ball valve within the valve body 604 between an opened position and a closed position. In certain arrangements, the ball valve 600 advantageously withstands water hammer and/or is substantially free from electromagnetic valve-related sounds that are often associated with outer types of valves, such as a quick closing latch.

As shown, the valve body 604 includes threaded connecting portions 606 and 608 for coupling to a supply line. For instance, either or both of the connecting portions 606 and 608 may include a ¾ inch National Pipe Taper (NPT) pipe thread for engagement with a supply line of a water heater or other appliance.

Although the present invention has been described in terms of circuit-based embodiments, the present invention can be implemented in a number of suitable configurations. For instance, the circuit preferably is placed on a printed circuit board. The functions of the circuit also can be replicated through software embodiments, can be done through solid-state electronics and through any of a variety of configurable controllers.

Moreover, although the present invention has been described in terms of certain arrangements, other arrangements apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A system for automatically detecting and correcting a fluid leak, the system comprising:

a sensor configured to provide a first voltage level when exposed to a fluid flowing from a fluid source, wherein the sensor is further configured to provide a second voltage level when not exposed to the fluid;

a valve module having at least one valve that is selectively switchable between an open position to allow fluid flow from the fluid source and a closed position to substantially arrest fluid flow from the fluid source;

an adjustable resistance device configured to provide a voltage threshold;

feedback circuitry configured to output a feedback voltage indicative of the position of the at least one valve; and a processor coupled to the sensor, the valve module, the adjustable resistance device and the feedback circuitry, wherein the processor is configured to output a first control signal to cause the valve module to close the at least one valve when the sensor is providing the first voltage level and the feedback voltage has not attained the voltage threshold, and wherein the processor is configured to output a second control signal to cause the valve module to open the at least one valve when the sensor is providing the second voltage level and the feedback voltage has not attained the voltage threshold.

2. The system of claim 1, wherein the valve module further comprises a motor configured to selectively switch the at least one valve between the open and closed positions.

3. The system of claim 1, wherein the feedback circuitry is configured to output a feedback voltage that attains the voltage threshold when the at least one valve has reached the closed position while the processor is outputting the first control signal or when the at least one valve has reached the open position while the processor is outputting the second control signal.

4. The system of claim 1, further comprising an alarm coupled to the processor and configured emit a signal when the sensor is providing the first voltage level.

5. The system of claim 4, wherein the signal is an audible tone.

6. The system of claim 1, further comprising at least one user input usable for selectively opening and closing the at least one valve.

7. The system of claim 1, wherein the fluid comprises water.

8. The system of claim 7, wherein the sensor is a thin elongated strip.

9. The system of claim 7, wherein the sensor is coupled to a first terminal and a second terminal, the sensor configured to electrically couple the first terminal to the second terminal when the sensor is exposed to the water.

10. A method for automatically detecting and restricting a fluid leak, the method comprising:

receiving a first sensing signal from a sensor when the sensor detects a fluid and receiving a second sensing signal when the sensor does not detect the fluid, the second sensing signal being different from the first sensing signal;

receiving a reference voltage from an adjustable resistance device;

receiving a feedback voltage indicative of a current flowing through a valve module coupled to a source for providing the fluid; and outputting a first control signal to the valve module to rotate a ball valve of the valve module from an open position, which allows flow of the fluid, to a closed position, which substantially arrests flow of the fluid, when receiving the first sensing signal and until the feedback voltage reaches the reference voltage.

11. The method of claim 10, wherein the source comprises a water line associated with an appliance.

12. The method of claim 10, additionally comprising stopping the output of the first control signal when the feedback voltage exceeds the reference voltage.

13. The method of claim 10, additionally comprising emitting an alarm in response to receiving the first sensing signal.

14. The method of claim 10, additionally comprising outputting a second control signal to the valve module to rotate the ball valve of the valve module from the closed position to the open position when receiving the second sensing signal and until the feedback voltage reaches the reference voltage.

15. The method of claim 14, wherein outputting the first control signal to the valve module comprises providing a first voltage to a first transistor coupled to a first terminal of the valve module.

16. The method of claim 15, wherein outputting the second control signal to the valve module comprises providing a second voltage to a second transistor coupled to a second terminal of the valve module.

17. The method of claim 10, additionally comprising cleaning the ball valve by periodically outputting the first control signal while receiving the second sensing signal.

18. An automatic leak detection and correction system comprising:

means for sensing a fluid flowing from a fluid source, wherein said sensing means outputs a first voltage when detecting the fluid and outputs a second voltage when not detecting the fluid;

means for selectively inhibiting fluid flow from the fluid source, said inhibiting means switchable between an open position to allow fluid flow and a closed position to inhibit fluid flow from the fluid source;

means for adjusting a threshold voltage;

means for providing a feedback voltage indicative of the position of said inhibiting means; and means for controlling said inhibiting means, wherein said controlling means outputs a first control signal to cause said inhibiting means to close when said sensing means outputs the first voltage and the feedback voltage has not attained the threshold voltage, and wherein said controlling means outputs a second control signal to cause said inhibiting means to open when said sensing means outputs the second voltage and the feedback voltage has not attained the threshold voltage.

19. The automatic leak detection and correction system of claim 18, further comprising means for alerting a user when said sensing means detects the fluid.

20. The automatic leak detection and correction system of claim 18, further comprising means for receiving input from a user to close said inhibiting means.

* * * * *